Patented Aug. 17, 1943

2,327,076

UNITED STATES PATENT OFFICE 2,327,076

GLAZED POTTERY

Johann Martin Stangl, Flemington, N. J., assignor to Fulper Pottery Company, Flemington, N. J., a corporation of New Jersey No Drawing. Application December 27, 1940, Serial No. 372,019

4 Claims. (Cl. 117—118)

My invention relates to decorated pottery ware and methods of producing the same and particularly to pottery ware which has a novel appearance generally similar to that of Italian pottery.

In accordance with my invention a colored or decorated body is provided with a semi-opaque or "milk glaze" which produces a subdued or modified effect on the color or design of the body.

In a typical case a body composed of a suitable clay which may be naturally or artificially colored is fired and a suitable design is applied to the fired piece. Thereafter, a "milk glaze" is applied to the fired body and the article is refired to impart semi-opaque or slightly clouded characteristics to the glaze.

In the practice of my invention the body preferably contains a small amount of pyrophyllite and the glaze contains tin oxide. It is my belief that these two substances react to produce a precipitate which gives the desired milky cast to the glaze of the finished product but I do not wish to be restricted to any particular theory or limited to the use of pyrophyllite and tin oxide in the production of products embodying my invention since the same or similar effects may be produced when using other reaction products in the glaze and body or other glaze composition to cause a limited precipitate to be produced in the glaze during the firing of the products.

One of the objects of my invention is to produce decorated pottery similar in appearance to Italian pottery and to provide novel methods of producing the same.

Another object of my invention is to produce pottery ware having the color of the body and any design applied thereto modified by a semi-opaque or "milk-glaze."

Another object of my invention is to provide a product having a glaze thereon embodying material precipitated to a limited extent during the firing of the product and serving to render the glaze semi-opaque.

A further object of my invention is to provide decorative pottery ware with a semi-opaque, tin oxide containing glaze thereon.

These and other objects and features of my invention will appear from the following description thereof in which typical examples are cited to indicate the nature of my invention.

In the preferred method of practicing my invention, the body is formed in any suitable manner and includes as an ingredient an agent which during a firing operation will react with the glaze subsequently applied to produce a limited precipitate in the glaze.

In a typical case the body is formed of china clay, flint and feldspar talc, barium carbonate and pyrophyllite, with the pyrophyllite present in an amount equal to from about 3 to 12% of the total weight of the body. The body is usually reddish in color due to naturally occurring impurities in the ingredients but it may be pure white or artificially colored if desired.

The body after firing may be decorated by painting, stenciling or otherwise and is then glazed with a composition which will react with the agent in the body during the firing operation to form a limited precipitate so that it will have a milky or slightly clouded cast which modifies the color of the body and design without obscuring or concealing the same.

A typical glaze used on the body described above may be formed of china clay, lead oxide and tin oxide with the tin oxide comprising from about 2 to 10% of the total weight of the glaze. When fired the glaze contains a limited precipitate of tin oxide which serves to render it semi-opaque or slightly clouded.

The design remains clear cut in its outline and features but its colors are so modified that they blend harmoniously with each other and with the background color of the base. There frequently is a slight and inconspicuous mottled effect in the glaze which is only noticeable on close inspection and which probably is due to unequal distribution of the precipitate within the glaze. This slight lack of uniformity in the glaze is more noticeable on the undecorated pieces and in undecorated areas and adds to the pleasing effect produced by the process.

When desired a coloring agent such as cobalt or copper salts may be added to the glaze to give it a tint as well as the characteristic semi-opaque properties referred to above.

It is also possible to produce limited precipitates of other or colored bodies within the glaze by suitably varying the composition of the glaze or the body or both to embody substances which react during the firing operation to produce a clouded or semi-opaque effect.

These and other modifications and changes in the composition and method of producing articles in accordance with my invention may be made without departing from the spirit and scope thereof and therefore it should be understood that the particular compositions and examples herein specifically set forth are intended to be illustrative of my invention and are not intended to limit the scope thereof.

What I claim is:

1. Pottery ware comprising a base formed of ceramic material containing pyrophyllite, said base being covered by a tin oxide containing glaze which is semi-opaque due to the presence of a limited precipitate of a product formed by reaction between the base and glaze during the firing operation.

2. Pottery ware comprising a base formed of ceramic material containing from about 3 to 12% by weight of pyrophyllite and covered by a glaze containing from about 2 to 10% by weight of tin oxide, said ware being characterized by the presence of a limited white precipitate of material formed during a firing operation and serving to render the glaze semi-opaque.

3. Pottery ware comprising a base of fired ceramic material containing china clay, flint, feldspar talc, barium carbonate and pyrophyllite with the pyrophyllite amounting to from 3 to 12% by weight of the base, and covered by a glaze containing china clay, lead oxide and tin oxide, with the tin oxide amounting to from 2 to 10% by weight of the glaze, said ware being characterized by the presence of a limited white precipitate in the glaze serving to render the glaze semi-opaque.

4. A method of producing decorated pottery ware similar in appearance to Italian pottery which comprises the steps of forming a body of material containing about 3 to 12% by weight of pyrophyllite firing and decorating said body, applying to the fired and decorated body a glaze containing about 2 to 10% by weight of tin oxide and refiring said ware under conditions which cause constituents of the base and glaze to react to produce a precipitate in the glaze sufficient to render the glaze semi-opaque but insufficient to obscure the decoration.

JOHANN MARTIN STANGL.